3,023,177
WATER-REDUCIBLE COATING COMPOSITION
John B. Boucher, Dearborn, Mich., assignor to Rinshed-Mason Company, Detroit, Mich., a corporation of Michigan
No Drawing. Filed Sept. 11, 1958, Ser. No. 760,304
12 Claims. (Cl. 260—21)

This invention relates to a water-reducible coating composition. More particularly, this invention relates to a pigmented water-reducible coating composition comprising a vehicle, a pigment, and a water solvent therefor and in which the pigment is dispered in the vehicle.

A water-reducible coating composition or "water-thinned" coating composition is characterized in that the vehicle is a water emulsion or water dispersion or solution as contrasted to conventional paints where the vehicle is dissolved in an organic solvent. The vehicle of water-reducible paints is ordinarily a latex, i.e. a fluid in which small particles of natural or synthetic rubber or plastic are suspended in water. The advantages of such a water system are a reduction in fire hazards since flammable solvents are replaced by water, the availability and cheapness of the water solvent, the lack of odor and obnoxious fumes to be controlled during the manufacture and use of the coating composition, the lack of need for an expensive solvent recovery system, and the fact that a high molecular weight vehicle may be used without the paint becoming viscous and difficult to apply. In general, high molecular weights result in tougher applied films.

One disadvantage of water-reducible paints is the difficulty of obtaining proper pigment dispersion. In conventional organic solvent reduced systems the pigment is coated or wetted by the paint vehicle. However, until the present invention, it has been necessary in water-thinned paints to disperse the pigment in the water phase since pigments are not dispersible in the latex vehicles commonly used. It has consequently been necessary to use various surfactants, pigment dispersants and protective colloids in order to improve the dispersion and stability of the pigment in the water and to make it easier to combine with the latex. This has resulted in poor particle size, dispersion, and stability as compared to similar pigment and vehicle components in an organic solvent solution system. Also, it has been necessary to use pigment dispersants and surfactants which are water soluble, with the result that the water resistance of applied coatings is unsatisfactory for many uses. Further, in paints where more than one pigment is used it is a complex and difficult problem to determine the amount and kind of dispersants to be used since the selection of proper dispersants is related to each specific pigment and also to the latex. This type of pigment dispersion also results in a non-homogeneous dry film whereby it is difficult to blend succeeding coats to form a smooth continuous surface. Another disadvantage of dispersing the pigment in water by means of surfactants and dispersants is that the slurry thus formed is not tacky which limits the type of equipments which may be used for dispersion and processing.

It is therefore an object of this invention to provide a water-reducible coating composition in which the pigment is dispersible in the vehicle or in a portion thereof.

Another object of this invention is to provide such a coating composition having improved pigment dispersion which will result in an applied film that is smoother, more homogeneous and more continuous than water-thinned paints heretofore proposed.

A further object is the provision of such a coating composition which has improved pigment stability.

A still further object is the provision of a water-reducible coating composition which will result in a baked or air-dried applied film having improved resistance to water and water vapor.

Another object is to provide such a composition having improved application characteristics comparable to conventional paint products.

A still further object is to provide such a composition which may be readily manufactured without the necessity of complex dispersing formulations or the use of complex processing techniques.

The water-reducible coating composition of the present invention comprises a water phase, a vehicle emulsified or dispersed in the water phase, and a pigment dispersed in a portion of the vehicle. The coating composition of the present invention is particularly characterized in that a portion of the vehicle is a water emulsion or water dispersion such as a latex and a portion is a water-soluble resin capable of dispersing the pigment.

Pigments will not disperse in the ordinary aqueous latex vehicle of water-reducible coating compositions. It is undesirable to disperse the pigment in the water phase by the use of dispersants since, as previously mentioned, dispersants do not provide a good dispersion relative to the vehicle and do not themselves form a desirable constituent of the applied film. Consequently, it has been thought desirable to alter the vehicle so that it will be possible to disperse the pigment in a portion thereof. The pigment dispersing portion of the vehicle must have the following qualities in order to be satisfactory: it must be soluble or dispersible in water; it must be capable of dispersing the pigment; it must be compatible with the latex vehicle so as to be dispersible therein and thereby result in a more homogeneous dispersion of the pigment in the applied dried film; and lastly, the resin must be a good film-forming constituent. One desirable quality of the resin relative to its film-forming ability is that it becomes hydrophobic upon curing, either when cured by air drying at normal temperatures or baking at elevated temperatures.

A water-reduced coating composition prepared according to the present invention preferably has from 5 to 25 percent of the vehicle resin content as the water-soluble resin. The pigment may vary from 1 to 50 percent of the total non-volatile vehicle solids. Water may be added as desired to give the proper consistency to the composition, the proper consistency being normally determined by the method of application such as spraying, brushing, or dipping. Other adjuvants may, of course, be added to the composition as desired.

The aqueous latex may be any of several commercially available latices. However, acrylic resin latices have been found particularly suitable due to their compatibility with useful water-soluble resins and their desirable film-forming characteristics of durability and gloss retention.

Acrylic resins are thermoplastic polymers or copolymers of acrylic acid, methacrylic acid, esters of these acids, or acrylonitrile. Latices and mixtures of latices of polymers and copolymers of methyl methacrylate, ethyl methacrylate, butyl methacrylate and corresponding acrylates are suitable. Copolymers of acrylates and methacrylates with styrene and acrylonitrile are also useful as components of the latex portion. Such latices may be produced by emulsifying as is well known in the art. Examples of suitable commercially available latices are the products identified as Rhoplex B-85, Rhoplex AC33, Rhoplex B-60K, and Rhoplex B-60A produced by the Rohm and Haas Company, Philadelphia, Pennsylvania. Rhoplex B-85 is an aqueous dispersion of an extremely hard acrylic polymer, indicated as being essentially methyl methacrylate. Rhoplex B-60A and B-60K are acrylic emulsion polymers, indicated as being essentially ethyl acrylate modified with other acrylates or methacrylates, which yield soft films and may be readily blended with harder emulsion polymers to produce films of intermediate hardness. Rhoplex AC-33 is a milky white emulsion of an acrylic polymer in water. It is similar to B-60A and B-60K in that it is indicated as consisting essentially of ethyl acrylate.

Water-soluble or water-reducible resins which possess characteristics as previously enumerated and are suitable for pigment dispersion and as a film-forming ingredient may be for example, water-soluble alkyd resins such as are described in the copending patent application Serial No. 729,528, filed April 21, 1958, now abandoned, and combinations of these water-soluble resins with certain amine resins such, for example, as urea and melamine formaldehyde resins. The amine resins are preferably combined with the alkyd resins in amounts of from 5 to 40 percent of the total resin solids, with the remainder being the alkyd resin. The purpose of the use of amine resins in conjunction with the alkyd resins is to aid in the conversion and hardening of the alkyd resin film on baking. Amine resins which may be used are methylated, ethylated, isopropylated, propylated, and butylated melamine-formaldehyde resins. Suitable commercially available resins of this class are "Resloom E-50," a cyclic urea-formaldehyde resin produced by the Monsanto Chemical Company, "Uformite F-240," a butylated urea-formaldehyde resin produced by the Rohm and Haas Company, "Cymel 7273-7" a methylated melamine-formaldehyde resin produced by the American Cyanamid Company, and "Resloom M-80," a methylated melamine-formaldehyde resin produced by the Monsanto Chemical Company.

The water-soluble alkyd resins useful in this invention may be prepared as described in the aforementioned U.S. patent application. It is therein disclosed that alkyd resins having high acid numbers may be made water-soluble by reaction with a base. Alkyd resins are usually prepared with acid numbers below 15. However, if an alkyd resin is prepared with an acid number of from 25 to 70, preferably from 30 to 60, it will become water-soluble when treated with a selected base.

Alkyd resins ordinarily are prepared by the union of a polybasic acid or anhydride with a polyhydric alcohol such as a glycol or glycerine. The process may simply comprise the admixture of the acid and alcohol under conditions of heat whereby the acid and alcohol will react to form an alkyd resin. At the beginning of the reaction the acid value is relatively high i.e. above 70. As the reaction proceeds, the acid number falls until the reaction reaches completion when the acid number is at its minimum value i.e. below 15. If the reaction is stopped while the acid value is between 25 and 70, the resultant high acid value alkyd resin will become water-soluble upon treatment with a base.

Such high acid value alkyds, in general, exhibit properties similar to low acid value alkyds. However, there is a relationship between the acid number and stability and solubility. If the acid number is too high, i.e. above 70, the alkyd resin tends to be unstable and cannot be stored for periods sufficient for commercial use. Such high acid value resins will, however, become water-soluble when treated with a base. If the acid value is too low, i.e. below 25, the resin is very difficult to solubilize by treatment with a base.

The preparation of the water-soluble alkyd resin may be carried out in two basic steps. The first step comprises admixing the ingredients of the alkyd resin under conditions of heat until the resin forms and has the desired acid value. The second step comprises treating the alkyd resin with a base to obtain the final water-soluble resin. The acid number of the untreated resin should be in the range of from 25 to 70 based on the undiluted resin, and preferably from 30 to 60, in order to insure a stable, water-soluble resin.

The alkyd resins suitable for use according to the present invention are the ordinary resins prepared by the union of a polybasic acid or anhydride with a polyhydric alcohol such as a glycol or glycerine. The polybasic acid may be one of the suitable well known acids used in the preparation of alkyd resins such as phthalic anhydride, sebacic acid, maleic acid, azelaic acid, adipic acid and succinic acid. Other acids which may be used on a molar basis as a partial replacement are such as fumaric and isophthalic. Phthalic anhydride is, however, the preferred acid for use in forming the alkyd resin. Suitable polyhydric alcohols are glycerine, ethylene glycol and trimethylolpropane (2,2 dihydroxymethyl-1-butanol). A preferred alcohol is trimethylolethane (2 hydroxymethyl-2 methyl-1,3 propanediol).

The alkyd resin is preferably modified by a monobasic acid for commercial applications. This modification produces desirable qualities in the resin, particularly when it is used as a film-forming constituent in a coating composition. The monobasic acid is preferably admixed during the formation of the resin. The monobasic acid may be used as such or it may be incorporated as a natural oil. Suitable modifying agents of this class are, for example, linseed fatty acids, soya fatty acids, coconut fatty acids, conjugated linseed acids, pelargonic acid, tung oil, linseed oil, castor oil fatty acids, dehydrated castor oil fatty acids, tall oil fatty acids, and linoleic acid. Para-tertiarybutylbenzoic acid may be used as a partial replacement for phthalic acid and a monobasic acid.

Suitable bases for reaction with the modified alkyd resin are bases of the class of ammonia and its primary, secondary and tertiary aliphatic amines and their derivatives. Examples of suitable amines are dimethylaminoethanol, diethanolamine, diethylenetriamine, and triethanolamine. The aliphatic diamines such as ethylene diamine and propylene diamine are also useful. Cyclic amines have also been used with success. Some useful cyclic amines are morpholine, substituted morpholines, and piperidine. Preferred amines are triethylamine and dimethylaminoethanol.

One of the preferred methods of preparing the water-soluble alkyd resin is to admix the poylhydric alcohol and polybasic acid. The mixture is then reacted by means of heat, usually at a temperature above 170° C. If a monobasic acid is to be used, it should be admixed along with the polyhydric alcohol and polybasic acid. The heat should be maintained until the reaction has proceeded to the desired extent which may be measured by the acid number. The reaction has proceeded sufficiently when the acid number is in the range of from 25 to 70. After the desired acid value has been obtained and the resin allowed to cool, it is treated with a base to make it water-soluble. The base is preferably first dissolved in water and added to the resin with constant agitation. The resultant resin will dissolve in water in amounts of over 50 percent.

The quantities of the ingredients of the alkyd resin and the amount of solubilizing base will vary over a wide range according to the characteristics of the particular constitutents being used and may readily be determined in each case by one skilled in the art. The polybasic acid content of the alkyd resin may range from 15 to 45 percent, preferably from 20 to 40 percent of the total weight of the alkyd resin, the monobasic acid content may range from 15 to 55 percent, preferably from 20 to 45 percent, with the remainder being the polyhydric alcohol. The amount of solubilizing base used is that sufficient to neutralize or make alkaline the modified resin whereby the modified resin has a pH value of 6 or above. For improved stability and ease of solubility it is recommended that the pH value be between 6.8 and 9. The resin will be water-soluble if the pH is above 9 or below 6.8. However, pH values of from 6 to 11 are recommended as a commercially practicable range. If the pH is above about 11 the resin will not become as water resistant when cured. A further practical commercial factor is that when the pH is increased to higher values by means of the solubilizing base, an excess of base is used. This excess serves as a solvent whereas it is intended to use water as an inexpensive solvent for the resin.

If the pH is below 6 the resin becomes very difficult to dissolve in water. The proper amount of base may therefore be determined in each case by means of pH measurements.

A wide variety of pigments may be used with the water-reducible coating composition of the present invention. Among those which are suitable are titanium dioxide, carbon black, phthalocyanine blue, chrome yellow, green gold, ferric hydrate, lamp black, chrome orange, chrome green, phthalocyanine green, BON maroon, indo orange, molybdate orange, and toluidine red. In general, the only pigments which do not appear suited for use in these compositions are pigments such as iron blue and mineral violet which are sensitive to a basic environment and pigments such as zinc yellow and zinc oxide which, when used in the compositions of the present invention, produce a relatively large concentration of polyvalent ions.

One preferred method of preparing the water-reducible compositions of the present invention is to first disperse the pigment into the water-reducible resin. This may be done with conventional apparatus such as a porcelain lined ball mill, a three roll mill, a steel ball mill, a Baker-Perkins type mixer, a colloid mill, or an attritor-type mill. The dispersion should be carried out until the desired fineness of grind is obtained. It may then be reduced with water to form a paste which may be added to a mixture of the latices with stirring to produce the finished coating composition.

Examples of coating compositions prepared according to the present invention are as follows:

Example I

| | Parts by weight | |
|---|---|---|
| Soya fatty acids | 620 | |
| Trimethylolethane | 565 | Resin #1 |
| Phthalic anhydride | 615 | |
| Resin #1 | 1700 | |
| Ethylene glycol monobutyl ether | 170 | Soya alkyd |
| Dimethylethanolamine | 170 | solution #1 |
| Water | 1360 | |
| Soya alkyd solution #1 | 28 | |
| Titanium dioxide | 70 | |
| Water | 7 | |
| Acrylic latex (Rhoplex B-85) | 113 | |
| Acrylic latex (Rhoplex B-60K) | 94 | |

The soya fatty acids, trimethylolethelane and phthalic anhydride were reacted at 230° C. until the alkyd resin had an acid value of 58. The resin was then allowed to cool to 150° C. The ethylene glycol monobutyl ether was then added to the resin, identified as resin #1, and the solution was cooled to 85° C. The dimethylethanolamine was added slowly with stirring and the resultant reaction product was then dissolved in the water.

The pigment was then dispersed in the soya alkyd solution #1 and a small amount of water added to form a white paste. The acrylic latices B-85 (produced by the Rohm & Haas Company and having 38 percent as resin solids) and B-60K (produced by the Rohm & Haas Company and having 46 percent as resin solids) were added to the paste with mixing to produce the final composition which was a white coating composition.

Example II

| | Parts by weight | |
|---|---|---|
| Linseed fatty acids | 582 | |
| Trimethylolethane | 448 | Resin #2 |
| Phthalic anhydride | 570 | |
| Resin #2 | 1450 | Linseed alkyd |
| Triethylamine | 145 | solution #2 |
| Water | 1305 | |
| Linseed alkyd solution #2 | 20 | |
| Titanium dioxide | 60 | |
| Water | 10 | |
| Acrylic latex (Rhoplex B-85) | 95 | |
| Acrylic latex (Rhoplex B-60K) | 117 | |

The linseed fatty accids, trimethylolethane and phthalic anhydride were reacted at 220° C. and held at this temperature until an alkyd resin formed with an acid value of 59. The resin, identified as resin #2, was cooled to a temperature between 80–90° C. The triethylamine, dissolved in the water, was then added with stirring.

The pigment was dispersed in the linseed alkyd solution #2 along with the water to form a white paste. The paste was then mixed into the acrylic latices of Example I to form a white water-reducible coating composition.

Example III

| | Parts by weight |
|---|---|
| Soya alkyd solution #1 of Example I | 22.2 |
| Titanium dioxide | 50.0 |
| Urea-formaldehyde resin | 9.6 |
| Acrylic latex (Rhoplex B-85) | 93.0 |
| Acrylic latex (Rhoplex B-60K) | 106.0 |

The pigment was dispersed in a mixture of the soya alkyd solution #3 and urea-formaldehyde resin (Resloom E-50 produced by the Monsanto Chemical Corporation). This composition was then mixed into the acrylic latices of Example I to form a white coating composition.

Example IV

| | Parts by weight |
|---|---|
| Soya alkyd solution #1 of Example I | 22.4 |
| Titanium dioxide | 60.0 |
| Urea-formaldehyde resin | 4.7 |
| Water | 3.0 |
| Acrylic latex (Rhoplex B-85) | 90.0 |
| Acrylic latex (Rhoplex B-60K) | 112.0 |

The pigment, soya alkyd solution #1, and urea-formaldehyde resin (Uformite F-240 produced by the Rohm & Haas Company) were dispersed in a Baker-Perkins type mixer and this dispersion was mixed with the water and added to the acrylic latices of Example I to form a white coating composition.

Example V

| | Parts by weight | |
|---|---|---|
| Pelargonic acid | 420 | |
| Trimethylolethane | 525 | Resin #5 |
| Phthalic anhydride | 615 | |
| Resin #5 | 1470 | Pelargonic |
| Dimethylethanolamine | 147 | alkyd solution |
| Water | 1323 | #5 |
| Pelargonic alkyd solution #5 | 28.0 | |
| Titanium dioxide | 60.0 | |
| Melamine-formaldehyde resin | 7.5 | |
| Acrylic latex (Rhoplex B-85) | 95.0 | |
| Acrylic latex (Rhoplex B-60K) | 96.0 | |

The pelargonic acid, trimethylolethane and phthalic anyhydride were reacted at a temperature of 225° C. until an acid value of 60 was reached. The alkyd resin, identified as resin #5, was cooled to a temperature of 80° C.

and then treated with the dimethylethanolamine dissolved in the water resulting in the pelargonic alkyd solution #5. The pigment, pelargonic alkyd solution #5 and melamine-formaldehyde resin (Cymel 7273-7 produced by the American Cyanamid Company) were dispersed in a Baker-Perkins type mixer and this dispersion was added to the acrylic latices to form a white coating composition.

*Example VI*

| | Parts by weight |
|---|---|
| Soya alkyd solution #1 of Example I | 21.6 |
| Titanium dioxide | 50.0 |
| Melamine-formaldehyde resin | 9.0 |
| Acrylic latex (Rhoplex B-85) | 75.0 |
| Acrylic latex (Rhoplex B-60K) | 116.0 |

The pigment, soya alkyd solution, and melamine-formaldehyde resin (Resloom M-80 produced by the Monsanto Chemical Company) were dispersed in a Baker-Perkins type mixer and added to the acrylic latices of Example I to form a white coating composition.

*Example VII*

| | Parts by weight | |
|---|---|---|
| Pelargonic alkyd solution #5 of Example V | 479 | Paste A |
| Titanium dioxide | 1,970 | |
| Melamine-formaldehyde resin | 126 | |
| Water | 36 | |
| Pelargonic alkyd solution #5 of Example V | 581 | Paste B |
| Iron yellow | 139 | |
| Yellow toner | 57 | |
| Bone black | 29 | |
| Melamine-formaldehyde resin | 155 | |
| Water | 301 | |
| Paste A | 2,500 | |
| Paste B | 1,009 | |
| Acrylic latex (Rhoplex B-85) | 5,300 | |
| Acrylic latex (Rhoplex B-60K) | 5,300 | |

355 parts of the pelargonic alkyd solution, 95 parts of the melamine-formaldehyde resin (Cymel 7273-7 produced by the American Cyanamid Company) and the pigment were dispersed in a Baker-Perkins type mixer. This dispersion was then mixed with the remaining pelargonic alkyd solution and melamine-formaldehyde resin along with the water to form a white paste identified as paste A.

Paste B was formed by dispersing the pigments in the pelargonic alkyd solution and melamine-formaldehyde resin (Cymel 7273-7) by means of a 3-roll mill and adding the water to result in a gold hued paste. Paste A and paste B were then inter-mixed and added to the acrylic latices to produce a gold coating composition.

*Example VIII*

| | Parts by weight | |
|---|---|---|
| Soya fatty acids | 620 | Resin #8 |
| Trimethylolethane | 565 | |
| Phthalic anhydride | 615 | |
| Resin #8 | 1700 | Soya alkyd solution #8 |
| Dimethylethanolamine | 170 | |
| Water | 1530 | |
| Soya alkyd solution #8 | 103 | Green paste |
| Phthalocyanine green | 80 | |
| Melamine-formaldehyde resin | 43 | |
| Water | 69 | |
| Green paste | 49 | |
| Acrylic latex (Rhoplex B-85) | 149 | |
| Acrylic latex (Rhoplex B-60A) | 142 | |

The soya fatty acids, trimethylolethane and phthalic anhydride were reacted at 230° C. until an alkyd resin formed with an acid value of 58. The resin, identified as resin #8, was then cooled to 85° C. and the dimethylethanolamine was added slowly with stirring. The amine treated resin was then dissolved in the water.

The pigment, soya alkyd solution, and melamine-formaldehyde resin (Resloom M-80 produced by the Monsanto Chemical Company) and water were dispersed on a 3-roll mill to form a green paste.

The paste was then added to a mixture of the latices to form a green composition. Acrylic latex B-60A, produced by the Rohm and Haas Company and having 46 percent as resin solids, was substituted for the latex B-60K of Examples I-VII.

*Example IX*

| | Parts by weight | |
|---|---|---|
| Linseed alkyd solution #2 of Example II | 170 | Blue paste |
| Phthalocyanine blue | 80 | |
| Water | 45 | |
| Blue paste | 49 | |
| Water | 12 | |
| Acrylic latex (Rhoplex B-85) | 191 | |
| Acrylic latex (Rhoplex B-60A) | 192 | |

The pigment, linseed alkyd solution and water were dispersed on a 3-roll mill to form a blue paste. The paste and additional water were added to the latex mixture of Example VIII to form a blue coating composition.

*Example X*

| | Parts by weight | |
|---|---|---|
| Pelargonic alkyd solution #5 of Example V | 219 | Red paste |
| Beta oxynaphthalene maroon | 120 | |
| Melamine-formaldehyde resin | 24 | |
| Water | 80 | |
| Red paste | 57 | |
| Water | 12 | |
| Acrylic latex (Rhoplex B-60K) | 149 | |
| Acrylic latex (Rhoplex B-85) | 142 | |

The pigment, pelargonic alkyd solution and melamine-formaldehyde resin (Resloom M-80 produced by the Monsanto Chemical Company) and water were dispersed on a 3-roll mill to form a red paste. The red paste with additional water was added to the latex mixture of Example I to form a red coating composition.

*Example XI*

| | Parts by weight | |
|---|---|---|
| Soya alkyd solution #8 of Example VIII | 146 | Red paste |
| Cadmium red light | 300 | |
| Melamine-formaldehyde resin | 16 | |
| Water | 53 | |
| Red paste | 96 | |
| Acrylic latex (Rhoplex B-60A) | 149 | |
| Acrylic latex (Rhoplex B-85) | 142 | |

The pigment, soya alkyd solution, melamine-formaldehyde resin (Cymel 7273-7 produced by the American Cyanamid Company) and water were dispersed on a 3-roll mill to form a red paste. The paste was added to the latex mixture of Example VII to form a red coating composition.

*Example XII*

| | Parts by weight | |
|---|---|---|
| Soya alkyd solution #8 of Example VIII | 29.0 | Aluminum paste |
| Aluminum pigment solids | 14.7 | |
| Melamine-formaldehyde resin | 4.5 | |
| Green coating composition of Example VIII | 100 | |
| Aluminum paste | 5 | |

The pigment, soya alkyd solution, melamine-formaldehyde resin (Resloom M-80 produced by the Monsanto Chemical Company) were mixed thoroughly and added to the green composition of Example VIII to form an aluminum pigment coating composition.

The coating compositions of the present invention are preferably applied over a primed surface, and may be applied by such standard methods as dipping, spraying or brushing. They are particularly useful in spray applications because they can be sprayed at a higher viscosity and solids ratio than compositions using conventional organic solvent solutions of similar polymers. The applied films may be cured by baking at temperatures in the range of from 100 to 175° C. A gloss finish may be obtained by polishing with standard polishing compounds.

Having thus described my invention, I claim:

1. A water-reducible coating composition consisting essentially of from 75–95% by weight, based on the polymeric solids content, of an acrylic resin latex, from 5–25% by weight of an oil and amine modified water-soluble alkyd resin dispersed in the latex, and a pigment dispersed in the alkyd resin; said alkyd resin comprising the reaction product of a resin having an acid number of from 25 to 70 and an aliphatic amine; said last mentioned resin comprising the reaction products of a polycarboxylic acid, a monocarboxylic acid and a polyhydric alcohol.

2. A water-reducible coating composition consisting essentially of from 75–95% by weight, based on the polymeric solids content, of an acrylic resin latex, from 5–25% by weight of an oil and amine modified water-soluble alkyd resin dispersed in the latex, and a pigment dispersed in the alkyd resin; said alkyd resin comprising the reaction product of a resin having an acid number of from 25 to 70 and a neutralizing agent selected from the group consisting of ammonia and its primary, secondary and tertiary aliphatic amines; said last mentioned resin comprising the reaction products of a polycarboxylic acid, a monocarboxylic acid, and a polyhydric alcohol.

3. A water-reducible coating composition consisting essentially of from 75–95% by weight, based on the polymeric solids content, of an acrylic resin latex, from 5–25% by weight of an oil and amine modified water-soluble alkyd resin dispersed in the latex, and a pigment dispersed in the alkyd resin; said alkyd resin comprising the reaction product of a resin having an acid number of from 25 to 70 and a neutralizing agent selected from the group consisting of ammonia and its primary, secondary and tertiary aliphatic amines; said last mentioned resin comprising the reaction products of from 15 to 45% by weight of a polycarboxylic acid, from 15 to 55% by weight of a monocarboxylic acid, the remainder being a polyhydric alcohol.

4. A coating composition as claimed in claim 3 and further characterized in that the pigment ranges from 1–50% by weight of the total non-volatile solids.

5. A coating composition as claimed in claim 3 and further characterized in that the water-soluble alkyd resin has a pH value above 6.

6. A coating composition as claimed in claim 3 and further characterized in that the water-soluble alkyd resin has a pH value above 6.8.

7. A water reducible coating composition consisting essentially of from 75–95% by weight, based on the polymeric solids content, of an acrylic resin latex, from 5–25% by weight of a water-soluble resin mixture comprising from 5–40% by weight of an amine aldehyde resin with the remainder being an oil and amine modified water-soluble alkyd resin, and a pigment dispersed in the water-soluble resin mixture; said alkyd resin comprising the reaction product of a resin having an acid number of from 25 to 70 and a neutralizing agent selected from the group consisting of ammonia and its primary, secondary and tertiary aliphatic amines; said last mentioned resin comprising the reaction products of a polycarboxylic acid, a monocarboxylic acid, and a polyhydric alcohol.

8. A coating composition as claimed in claim 7 and further characterized in that the amine aldehyde resin is a urea-formaldehyde resin.

9. A coating composition as claimed in claim 7 and further characterized in that the pigment ranges from 1–50% by weight of the total non-volatile solids.

10. A coating composition as claimed in claim 7 and further characterized in that the water-soluble alkyd resin has a pH value above 6.

11. A coating composition as claimed in claim 7 and further characterized in that the water-soluble alkyd resin has a pH above 6.8.

12. A coating composition as claimed in claim 7 and further characterized in that the amine aldehyde resin is a melamine-formaldehyde resin.

References Cited in the file of this patent

UNITED STATES PATENTS

| | | |
|---|---|---|
| 2,400,054 | Robinson et al. | May 7, 1946 |
| 2,852,476 | Cummings | Sept. 16, 1958 |